(12) United States Patent
Swanson

(10) Patent No.: US 12,296,891 B1
(45) Date of Patent: May 13, 2025

(54) TRAILER TAILGATE RAMP LIFT ASSIST

(71) Applicant: Neil James Swanson, Prescott, MI (US)

(72) Inventor: Neil James Swanson, Prescott, MI (US)

( * ) Notice: Subject to any disclaimer, the term of this patent is extended or adjusted under 35 U.S.C. 154(b) by 11 days.

(21) Appl. No.: 18/894,039

(22) Filed: Sep. 24, 2024

Related U.S. Application Data

(60) Provisional application No. 63/694,775, filed on Sep. 13, 2024.

(51) Int. Cl.
*B62D 33/03* (2006.01)

(52) U.S. Cl.
CPC .................................... *B62D 33/03* (2013.01)

(58) Field of Classification Search
CPC .......... B62D 33/03; B60P 1/435; B60P 1/438; E05F 1/1008
USPC ......... 296/57.1, 61; 16/76; 49/138, 386, 387
See application file for complete search history.

(56) References Cited

U.S. PATENT DOCUMENTS

| | | | |
|---|---|---|---|
| 2002/0167188 A1* | 11/2002 | Zagaroff | E05F 1/1008 296/57.1 |
| 2009/0189406 A1* | 7/2009 | Gleason | B60P 1/26 296/57.1 |
| 2018/0290693 A1* | 10/2018 | Ogden | B62D 33/03 |

* cited by examiner

*Primary Examiner* — Stephen T Gordon

(57) ABSTRACT

Many trailers require excessive lifting effort to raise a tailgate ramp. This invention reduces this lifting effort. The invention consists of a right and a left unit. They are installed with fasteners on the lower rear corners of the trailer frame aligned with the existing tailgate ramp hinges. They can be easily installed with minimal labor and no special tools or skill. The main functional element of each device is a torsion spring with the moving spring arm linked to the trailer tailgate ramp. As the tailgate ramp is fully lowered to the ground, the amount of lift effort approaches zero with still sufficient weight to allow the tailgate ramp to remain fully opened. As the tailgate ramp is raised to close, there is very little lifting effort required. The device has a set of sizes and torsion spring values that enable tuning to the specific trailer application.

8 Claims, 7 Drawing Sheets

Rear View of a Typical Utility Trailer

Rear View of a Typical Utility Trailer

TRAILER TAILGATE RAMP LIFT ASSIST

BACKGROUND

Many trailers require excessive lifting effort to raise the tailgate ramp. A device is required to reduce this lifting effort that can be easily installed after the trailer is produced with minimal labor and no special tools or skill.

SUMMARY

A bolt-on set of two trailer tailgate ramp lift assists addresses the excessive trailer tailgate ramp lifting effort. They are installed on the lower rear corners of the trailer frame aligned with the existing tailgate ramp hinges. The main functional element of the device is a torsion spring that is bolted to the trailer frame with the moving spring arm linked to the trailer tailgate ramp. As the tailgate ramp is lowered, the torsion springs are wound tighter. As the tailgate ramp is fully lowered to the ground, the amount of lift effort approaches zero with still sufficient weight to allow the tailgate ramp to remain fully opened. As the tailgate ramp is raised to close, there is very little lifting effort required. The device has a set of sizes and torsion spring values that enable tuning to the specific trailer application.

DRAWING DESCRIPTIONS

Figure 1:
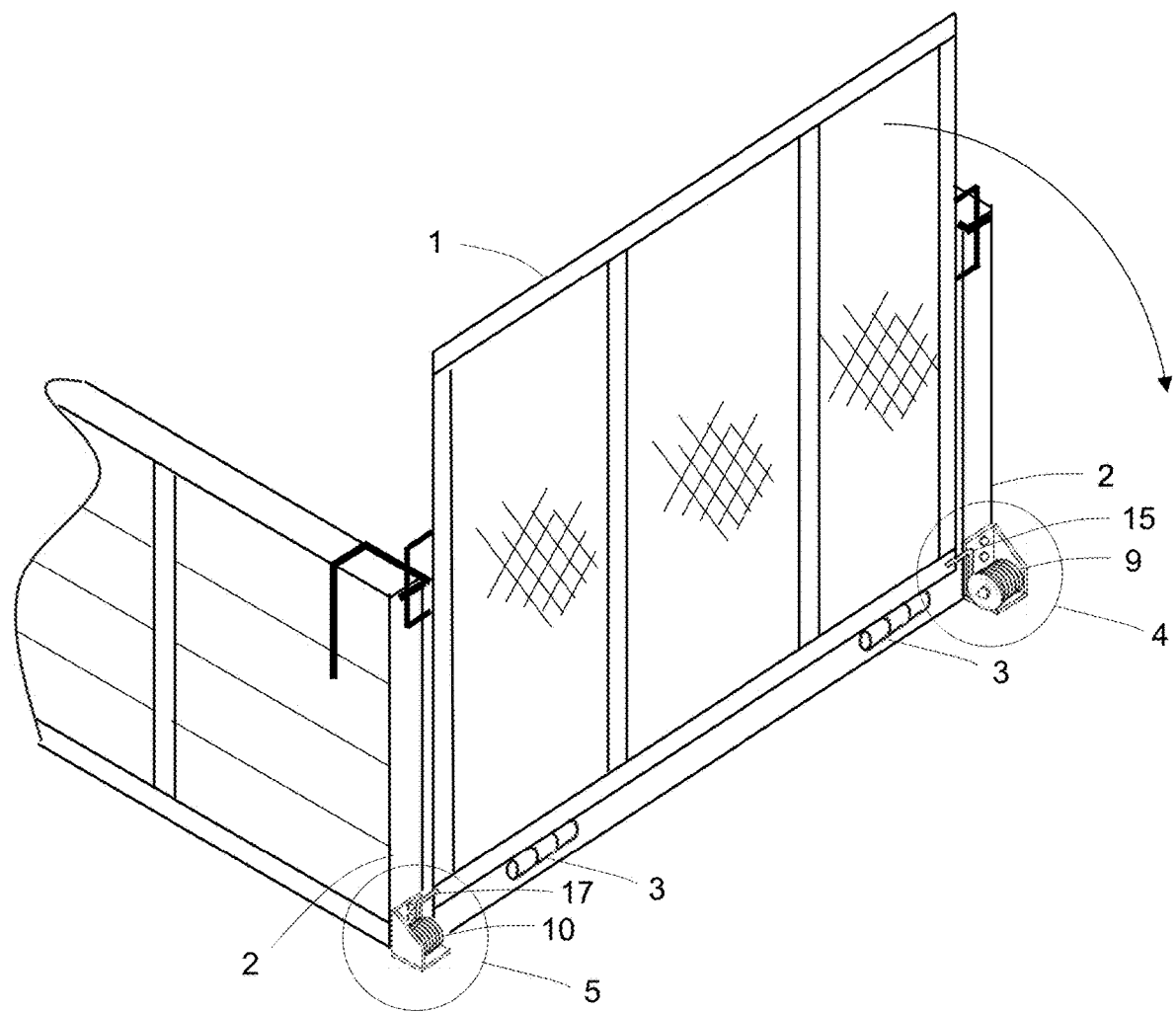

FIG. 1: Typical Utility Trailer Tailgate Ramp Rear View in the Closed Position
FIG. 2: Right Trailer Tailgate Ramp Lift Assist Exploded View
FIG. 3: Right Trailer Tailgate Ramp Lift Assist Assembly
FIG. 4: Left Trailer Tailgate Ramp Lift Assist Exploded View
FIG. 5: Left Trailer Tailgate Ramp Lift Assist Assembly
FIG. 6: Right Torsion Spring Embodiments
FIG. 7: Typical Lower Right Rear Trailer Corner

DETAILED DESCRIPTION

FIG. 1 is a rear view of a typical utility trailer with a tailgate ramp 1 that rotates down after unlatching from the trailer frame 2 using the trailer tailgate ramp hinges 3. A right Trailer Tailgate Ramp Lift Assist assembly 4 is fastened to the lower outside right corner of the trailer frame 2. A left Trailer Tailgate Ramp Lift Assist assembly 5 is fastened to the lower outside left corner of the trailer frame 2. The right torsion spring moving spring arm 15 of the right torsion spring 9 and the left torsion spring moving spring arm 17 of the left torsion spring 10 rests on the lower corners of the tailgate ramp 1. The exact embodiment and placement of the right torsion spring moving spring arm 15 and left torsion spring moving spring arm 17 depends on the individual trailer design. The right torsion spring 9 axis of rotation and the left torsion spring 10 axis of rotation should be aligned as close as possible to the existing trailer tailgate ramp hinges 3 axis of rotation.

Figure 2:
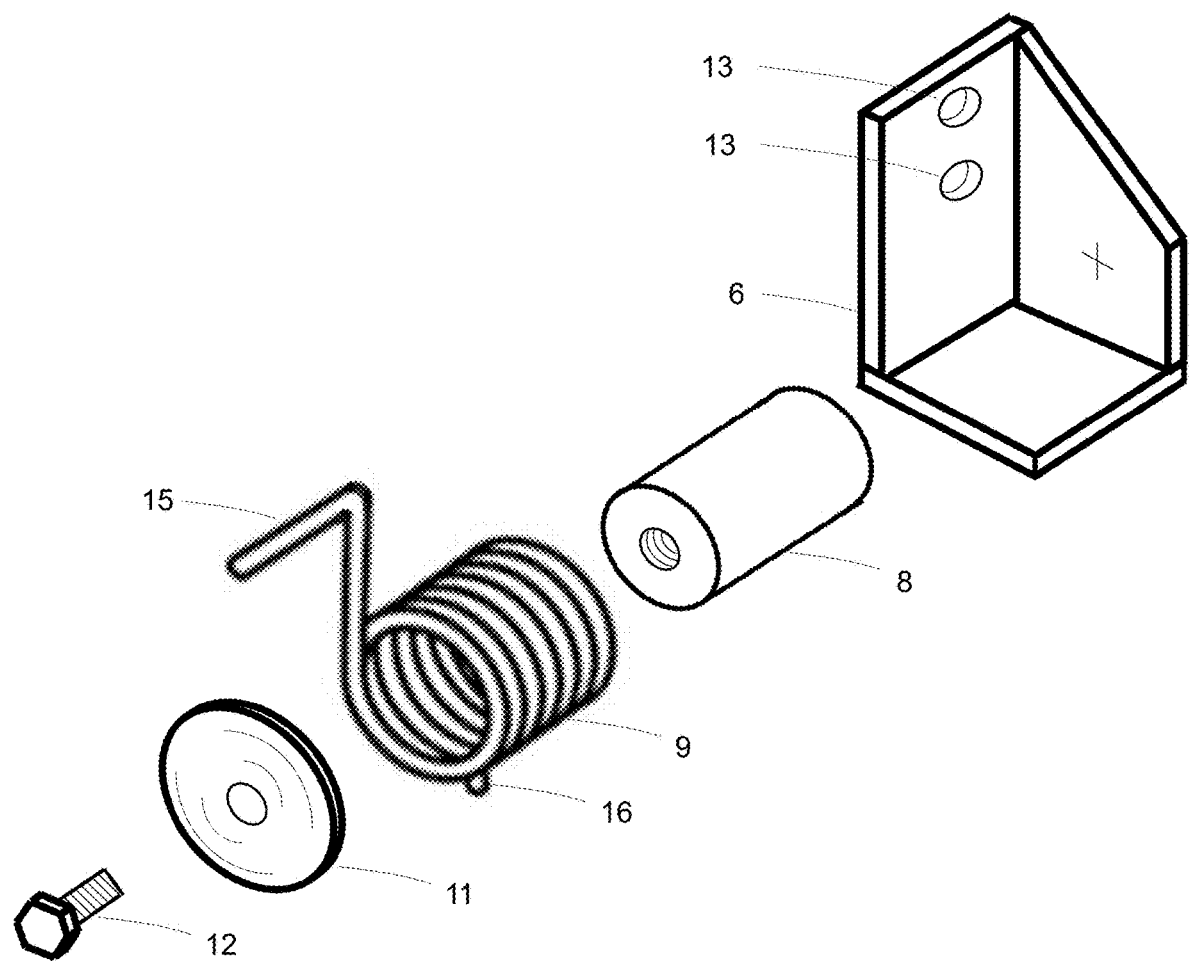
Figure 3:
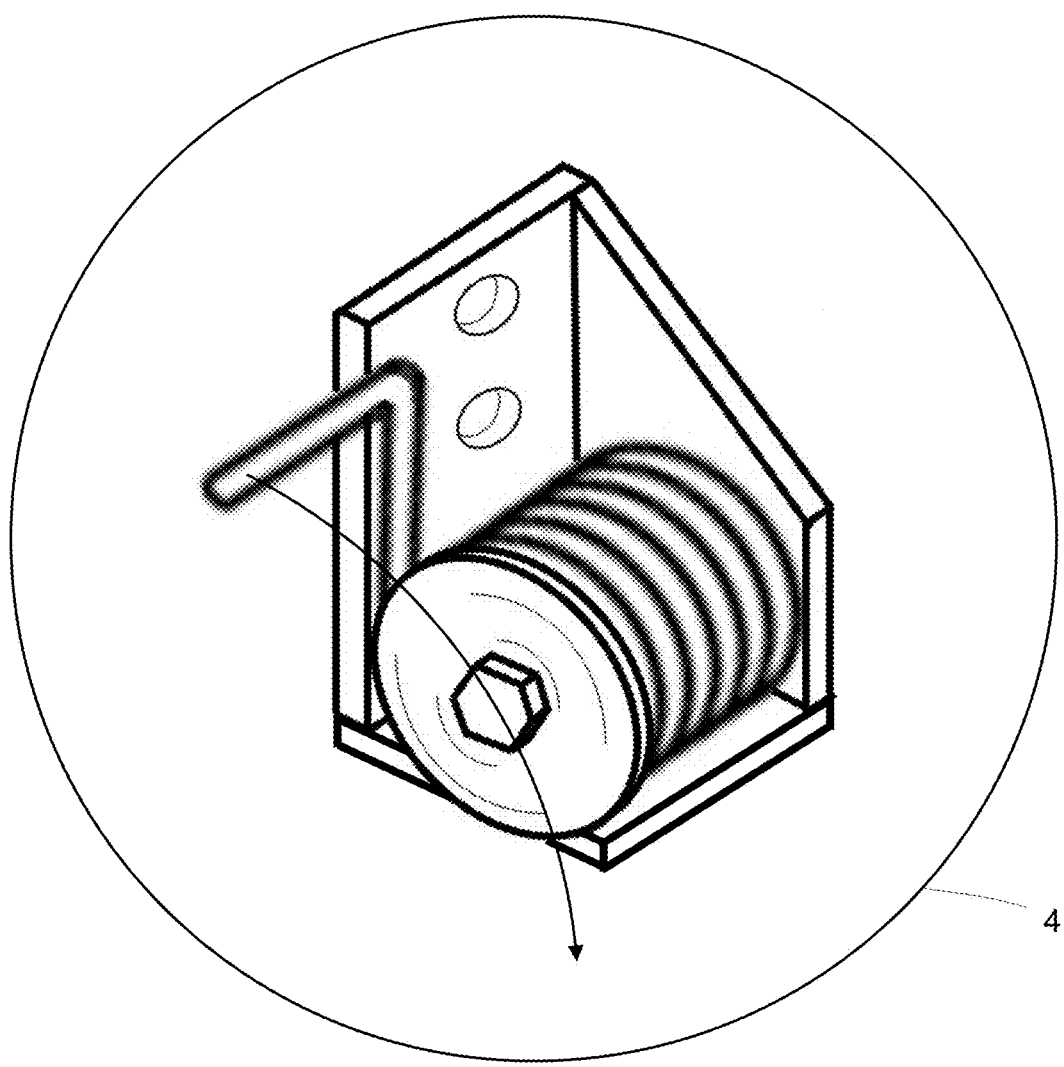
Figure 4:
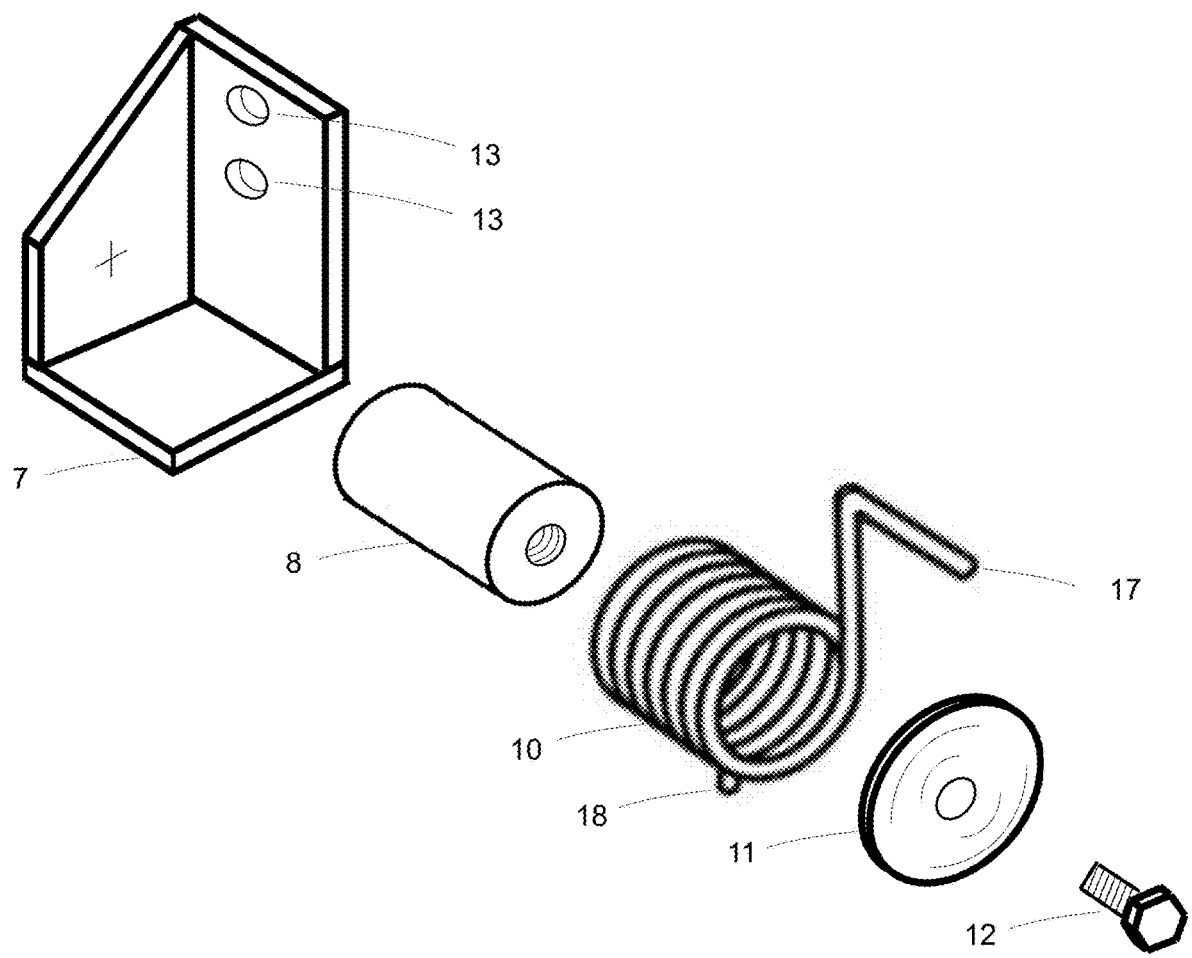
Figure 5:
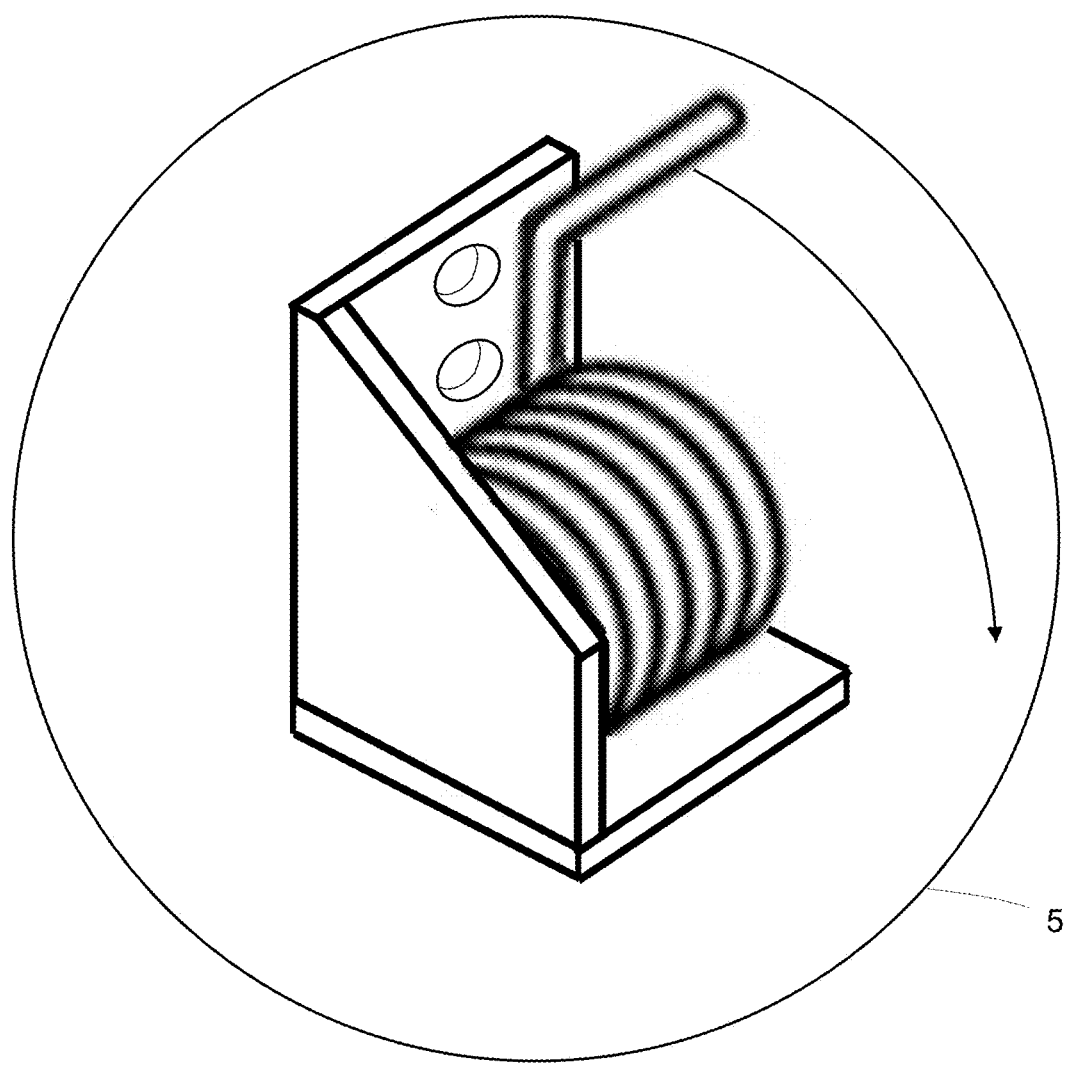
Figure 6:
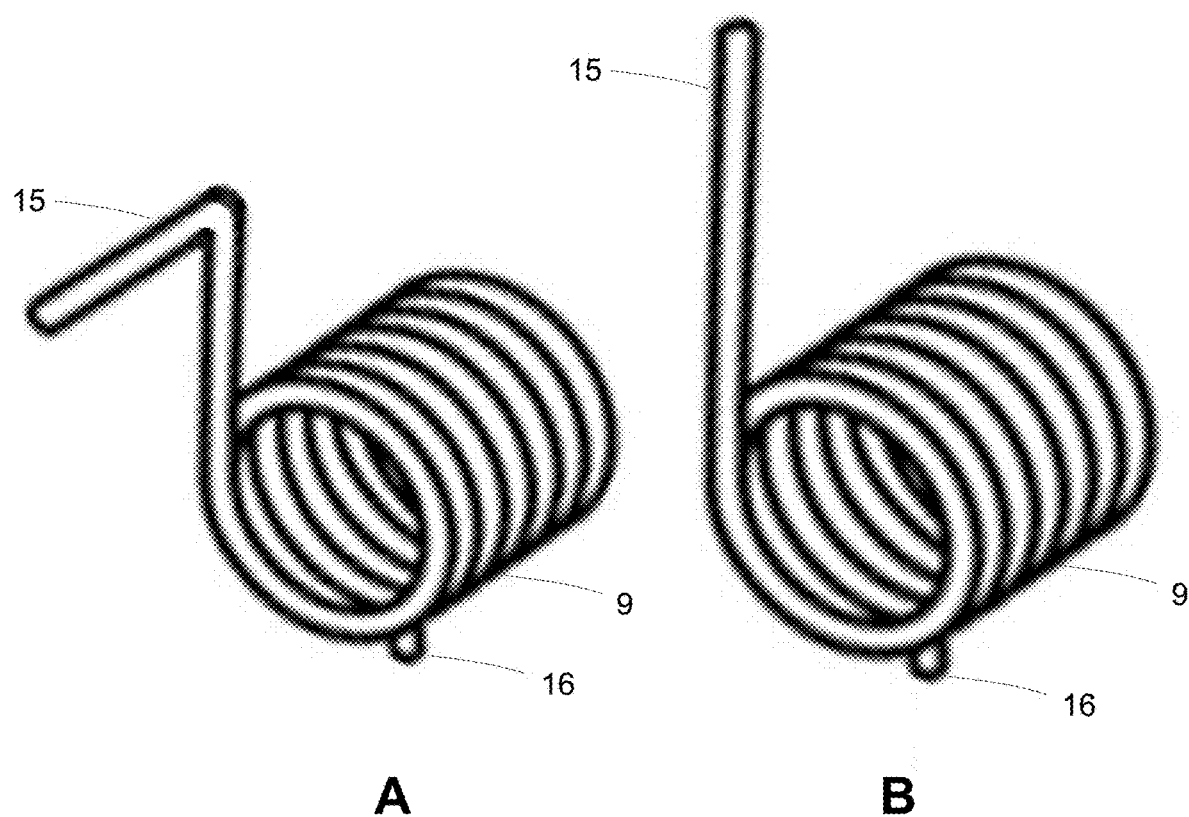

FIG. 2 shows the individual components in an exploded view of the right Tailgate Ramp Lift Assist. The individual pieces are the right spring frame 6, spring rod 8, right torsion spring 9, retaining washer 11 and retaining bolt 12. The spring rod 8 is affixed to the right spring frame 6. The right torsion spring 9 is inserted onto the spring rod 8 with sufficient clearances to accommodate the contraction and elongation of the right torsion spring 9 as it is being wound tighter. The right torsion spring 9 has a right torsion spring fixed end 16 that engages the right spring frame 6 and has a right torsion spring moving spring arm 15. The spring rod 8 is drilled and tapped to accept a retaining bolt 12. The right torsion spring 9 is retained on the spring rod 8 with the retaining washer 11 and retaining bolt 12. The right spring frame 6 has mounting holes 13 that accept fasteners to affix the right spring frame 6 to the trailer frame 2. FIG. 3 shows the complete right Trailer Tailgate Ramp Lift Assist assembly 4 ready for trailer mounting. The left Tailgate Ramp Lift Assist individual components as shown in FIG. 4 are a mirror image of the right Trailer Tailgate Ramp Lift Assist assembly 4 shown in FIG. 2, resulting in unique left spring frame 7, left torsion spring 10, left torsion spring moving spring arm 17 and left torsion spring fixed end 18. Spring rod 8, retaining washer 11 retaining bolt 12 and mounting holes 13 are the same as in FIG. 2. FIG. 5 shows the complete left Trailer Tailgate Ramp Lift Assist assembly 5 ready for trailer mounting.

Figure 7:
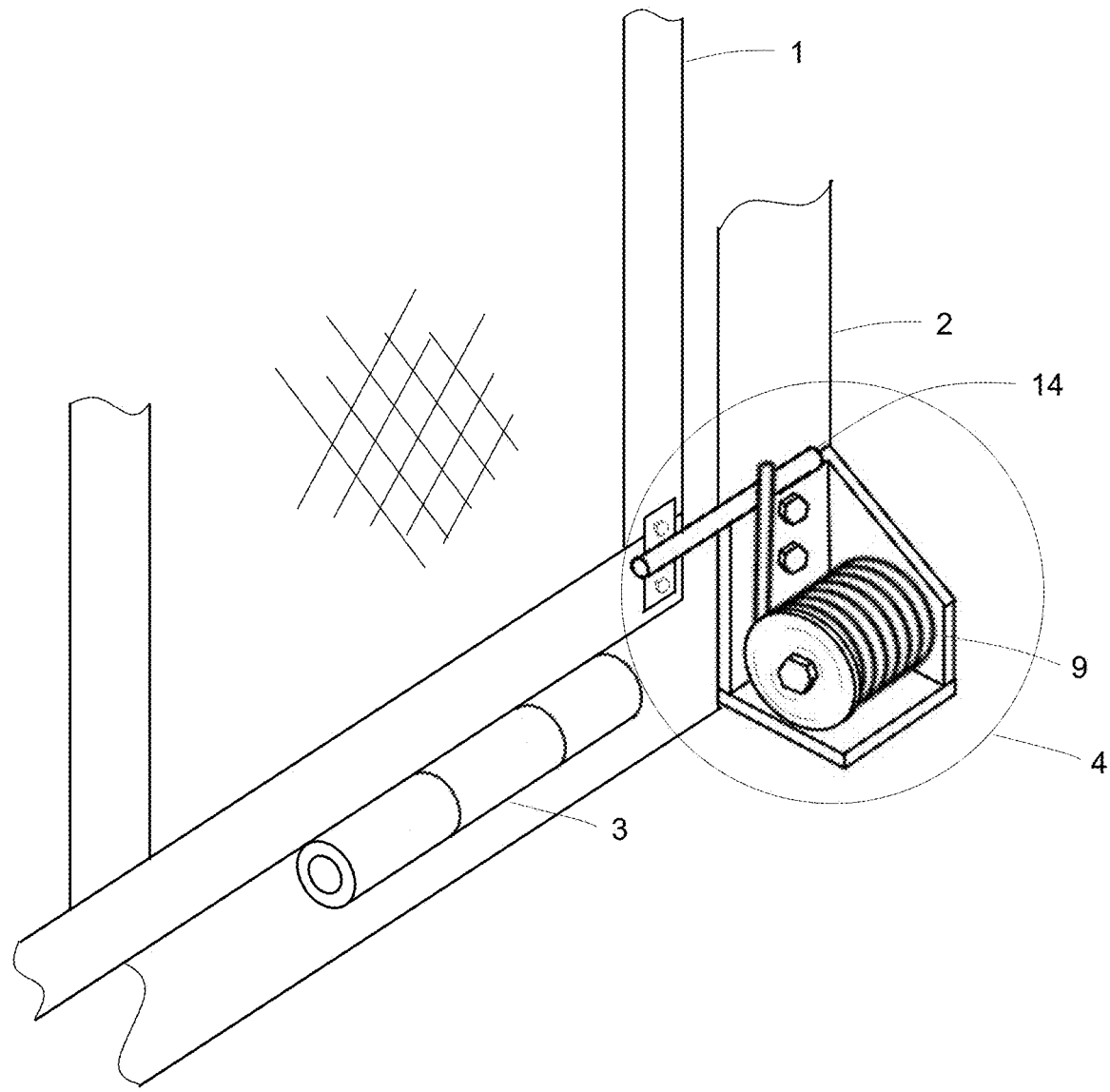

FIG. 6A is a right torsion spring 9 with a 90 degree bent right torsion spring moving spring arm 15. An alternative embodiment is FIG. 6B where the right torsion spring 9 has a straight right torsion spring moving spring arm 15. This design alternative requires a post 14 to be affixed to the trailer ramp 1 that pushes against the right torsion spring moving spring arm 15 of the right torsion spring 9 as shown in FIG. 7. FIG. 7 is the lower right rear corner of a typical utility trailer showing the mounting of the right Trailer Tailgate Ramp Lift Assist assembly 4 on the trailer frame 2 aligned with the trailer tailgate ramp hinge 3. The exact mounting and embodiment of the post 14 will depend on the tailgate ramp 1 design.

Various embodiments of the right spring frame 6 and left spring frame 7 are possible as long as they appropriately support and position the right torsion spring 9 and left torsion spring 10 respectively and can be fastened to the trailer frame 2. Various embodiments of the right torsion spring 9 and left torsion spring 10 are possible as long as they can accommodate the function as described.

PRIOR ART

There are existing trailer tailgate ramp lift assists consisting of torsion springs coaxially mounted with the hinges. These assist springs are integrated at the trailer tailgate ramp source and installed during trailer manufacturing. Without these assist springs the trailer tailgate ramp weight would be too excessive for most people. However, many trailers are still produced without this feature. Therefore, a need exists for a bolt-on trailer tailgate ramp lift assist device that can be added post production to reduce this lifting effort that can be easily installed with minimal labor and no special tools or skill.

There are existing devices available that consist of long coil springs mounted on the top trailer frame rail with cabling interconnecting the coil springs and the trailer tailgate ramp-U.S. Pat. No. 11,472,327B1-Tailgate lift assembly and related apparatus. These devices are bulky and interfere with the trailer usage.

Patent KR20240102671A-Opening and Closing System of Tailgate for Pickup Vehicles or WO2017003386A1-Labor-saving truck tailgate device have a bolt-on torsion spring lift assist for a pickup tailgate. These patented devices cannot function in the space or orientation of a trailer tailgate ramp 1 and the trailer frame 2 where the trailer tailgate ramp hinges 3 would be located.

The embodiment of this invention is novel as it is installed with fasteners on each lower corner of the trailer where space is usually available and is compact with no impact on trailer usage. Also, for improved functionality, the torsion springs of this embodiment are coaxially aligned to the existing trailer tailgate ramp hinge axis.

References Cited

| Publication Number | Date | Inventor |
| --- | --- | --- |
| KR20240102671A | July 2024 | 이준석 |
| US11472327B1 | October 2022 | Ralph Norfleet |
| US9908569B2 | March 2018 | Ralph Norfleet |
| WO2017065704A1 | April 2017 | Honglawan Chidchanok |
| WO2017003386A1 | January 2017 | Honglawan Chidchanok |
| CA2500749C | April 2011 | Ralph Norfleet |
| JP2009133086A | June 2009 | Minoru Kakizoe |
| US7556305B2 | July 2009 | Eric L. Stratten |
| US20080217949A1 | September 2008 | Michael D. Kobrehel |
| US2005/0127702A1 | June 2005 | Ralph Norfleet |
| US20030025352A1 | February 2003 | M & C Corporation |
| US5306113A | April 1994 | Fred W. Mann |

What is claimed is:

1. A right trailer tailgate ramp lift assist affixed to a trailer lower right frame comprising:
    a right spring frame;
    a spring rod with an end affixed to said right spring frame and a free end drilled and tapped to accept a retaining bolt;
    a right torsion spring concentrically mounted on said spring rod; and
    a retaining washer affixed to said spring rod free end with said retaining bolt.

2. A left trailer tailgate ramp lift assist affixed to a trailer lower left spring frame comprising:
    a left spring frame;
    a spring rod with an end affixed to said left spring frame and a free end drilled and tapped to accept a retaining bolt;
    a left torsion spring concentrically mounted on said spring rod; and
    a retaining washer affixed to said spring rod free end with said retaining bolt.

3. The right trailer tailgate ramp lift assist of claim 1, wherein said right torsion spring having a fixed end engaged with said right spring frame and a moving spring arm bent to directly contact and resist movement of a trailer tailgate ramp.

4. The left trailer tailgate ramp lift assist of claim 2, wherein said left torsion spring having a fixed end engaged with said left spring frame and a moving spring arm bent to directly contact and resist movement of a trailer tailgate ramp.

5. The right trailer tailgate ramp lift assist as in claim 1, wherein said right torsion spring having a fixed end engaged with said right spring frame and a straight moving spring arm.

6. The left trailer tailgate ramp lift assist as in claim 2, wherein said left torsion spring having a fixed end engaged with said left spring frame and a straight moving spring arm.

7. The right trailer tailgate ramp lift assist of claim 5 further comprising a separate right post affixed to a trailer tailgate ramp resisting said right torsion spring straight moving spring arm.

8. The left trailer tailgate ramp lift assist of claim 6 further comprising a separate left post affixed to a trailer tailgate ramp resisting said left torsion spring straight moving spring arm.

* * * * *